US011967439B2

(12) United States Patent
Sommer et al.

(10) Patent No.: US 11,967,439 B2
(45) Date of Patent: Apr. 23, 2024

(54) BORON X-RAY WINDOW

(71) Applicant: Moxtek, Inc., Orem, UT (US)

(72) Inventors: Jared Sommer, Bountiful, UT (US); Jonathan Abbott, Saratoga Springs, UT (US)

(73) Assignee: Moxtek, Inc., Orem, UT (US)

( * ) Notice: Subject to any disclaimer, the term of this patent is extended or adjusted under 35 U.S.C. 154(b) by 52 days.

(21) Appl. No.: 17/994,832

(22) Filed: Nov. 28, 2022

(65) Prior Publication Data

US 2023/0094257 A1 Mar. 30, 2023

Related U.S. Application Data

(63) Continuation of application No. 17/228,846, filed on Apr. 13, 2021, now Pat. No. 11,545,276.

(60) Provisional application No. 63/023,385, filed on May 12, 2020.

(51) Int. Cl.
*H01J 35/18* (2006.01)
*G21K 1/10* (2006.01)

(52) U.S. Cl.
CPC ...................................... *G21K 1/10* (2013.01)

(58) Field of Classification Search
CPC ........ H01J 35/18; H01J 2235/183; H01J 5/18; H01J 2235/18; H01J 33/04; H01J 2235/082; H01J 2235/122; H01J 47/004; H01J 2235/166; H01J 35/025; H01J 35/116; H01J 35/16; H01J 2235/1216; H01J 2209/18; H01J 35/32
See application file for complete search history.

(56) References Cited

U.S. PATENT DOCUMENTS

| | | | |
|---|---|---|---|
| 4,862,490 A | 8/1989 | Karnezos et al. | |
| 10,636,614 B2 | 4/2020 | Sommer et al. | |
| 11,545,276 B2 * | 1/2023 | Sommer | G21K 1/10 |
| 2008/0296479 A1 | 12/2008 | Anderson et al. | |
| 2009/0173897 A1 | 7/2009 | Decker et al. | |
| 2013/0051535 A1 | 2/2013 | Davis et al. | |
| 2017/0040138 A1 | 2/2017 | Kumar et al. | |
| 2018/0323033 A1 | 11/2018 | Black et al. | |
| 2019/0002298 A1 | 1/2019 | Harsam et al. | |
| 2019/0056654 A1 | 2/2019 | Peter et al. | |
| 2019/0214217 A1 | 7/2019 | Sommer et al. | |

* cited by examiner

*Primary Examiner* — Don K Wong
(74) *Attorney, Agent, or Firm* — Thorpe North & Western, LLP.

(57) ABSTRACT

An x-ray window can include a boron-film 12 and an aluminum-film 52 spanning an aperture 15 of a support-frame 11. The boron-film 12 and the aluminum-film 52 can be the only films, or the primary films, spanning the aperture. The boron-film 12 can include boron and hydrogen. An annular-film 32 can adjoin the support-frame 11, on an opposite side of the support-frame 11 from the boron-film 12. The annular-film 32 can include boron and hydrogen. The annular-film 32 can have the same material composition as, and can be similar in thickness with, the boron-film 12.

20 Claims, 4 Drawing Sheets

BORON X-RAY WINDOW

CLAIM OF PRIORITY

This application is a continuation of US Patent Application Number U.S. Ser. No. 17/228,846, filed on Apr. 13, 2021, which claims priority to U.S. Provisional Patent Application No. 63/023,385, filed on May 12, 2020, which are incorporated herein by reference.

FIELD OF THE INVENTION

The present application is related to x-ray windows.

BACKGROUND

X-ray windows are used in expensive systems requiring high reliability. High system requirements result in demanding characteristics of the x-ray window.

BRIEF DESCRIPTION OF THE DRAWINGS (DRAWINGS MIGHT NOT BE DRAWN TO SCALE)

Figure 1:
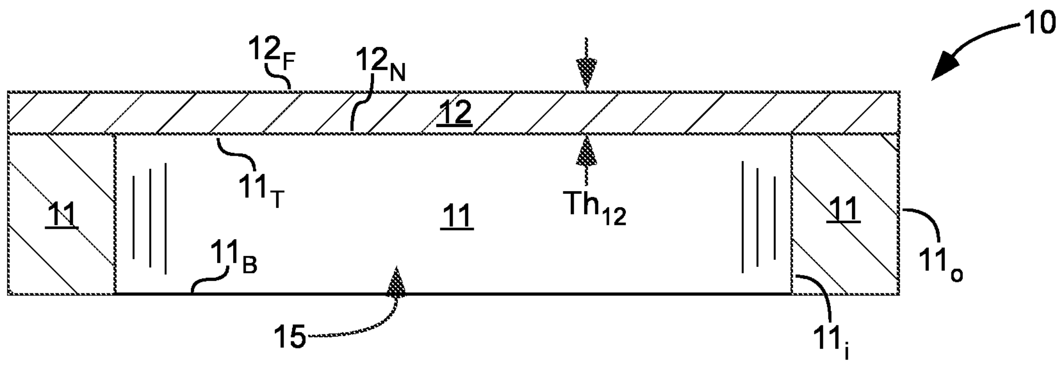

FIG. 1 is a cross-sectional side-view of an x-ray window 10 comprising a boron-film 12 hermetically sealed to a support-frame 11, the support-frame 11 encircling an aperture 15.

Figure 2:
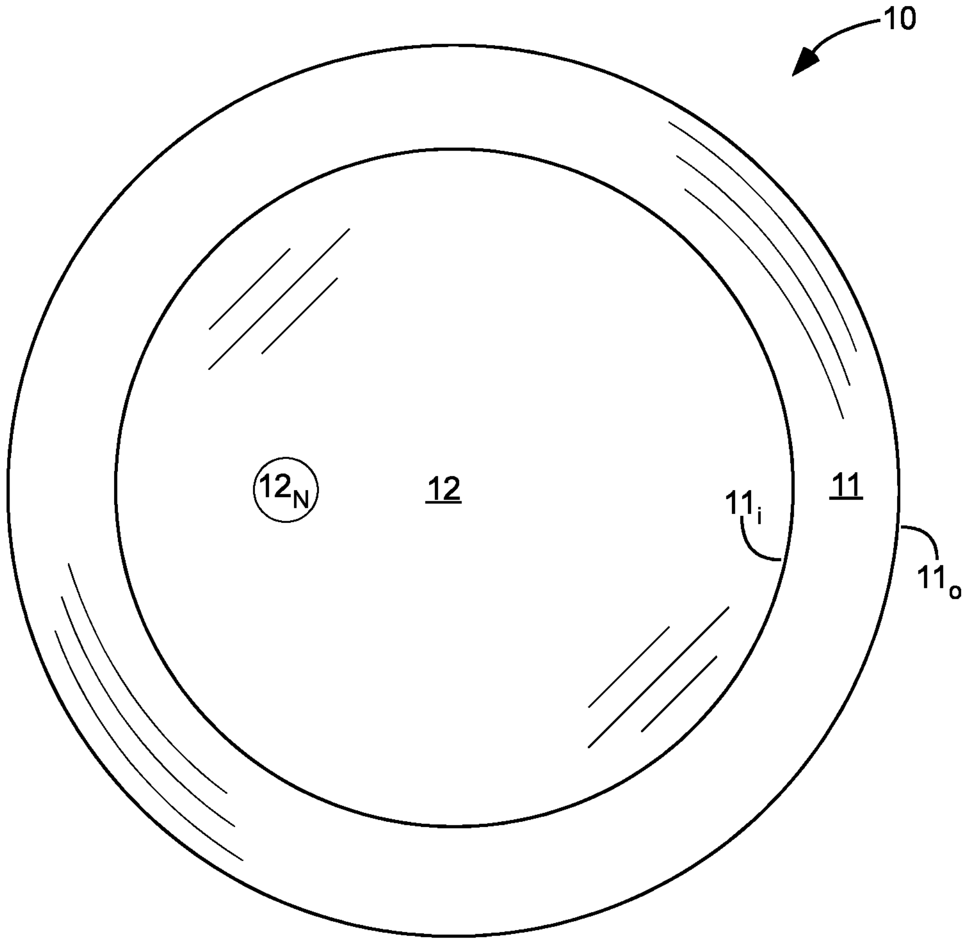

FIG. 2 is a bottom-view (support-frame 11 side) of the x-ray window 10 of FIG. 1.

Figure 3:
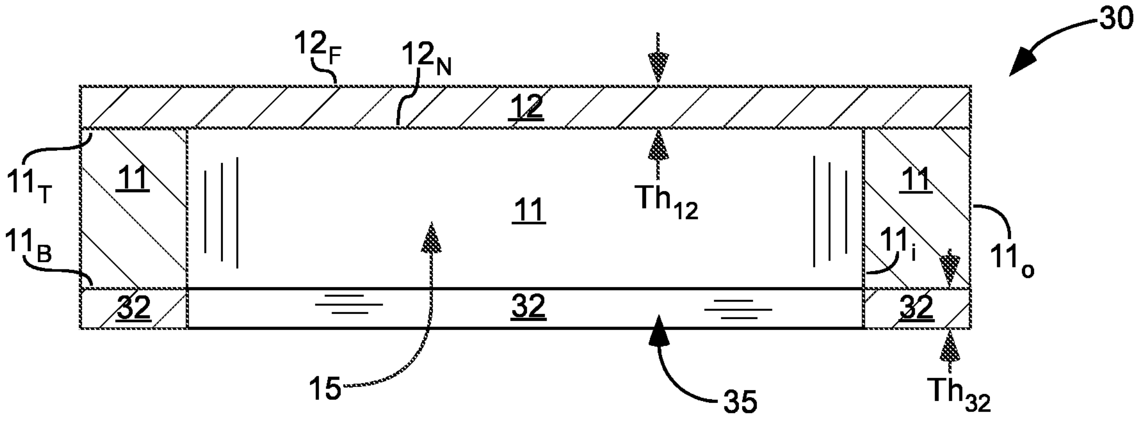

FIG. 3 is a cross-sectional side-view of an x-ray window 30 comprising a support-frame 11 encircling an aperture 15 and having a top-side 11$_T$ and a bottom-side 11$_B$, a boron-film 12 on the top-side 11$_T$ of the support-frame 11, and an annular-film 32 on the bottom-side 11$_B$ of the support-frame 11.

Figure 4:
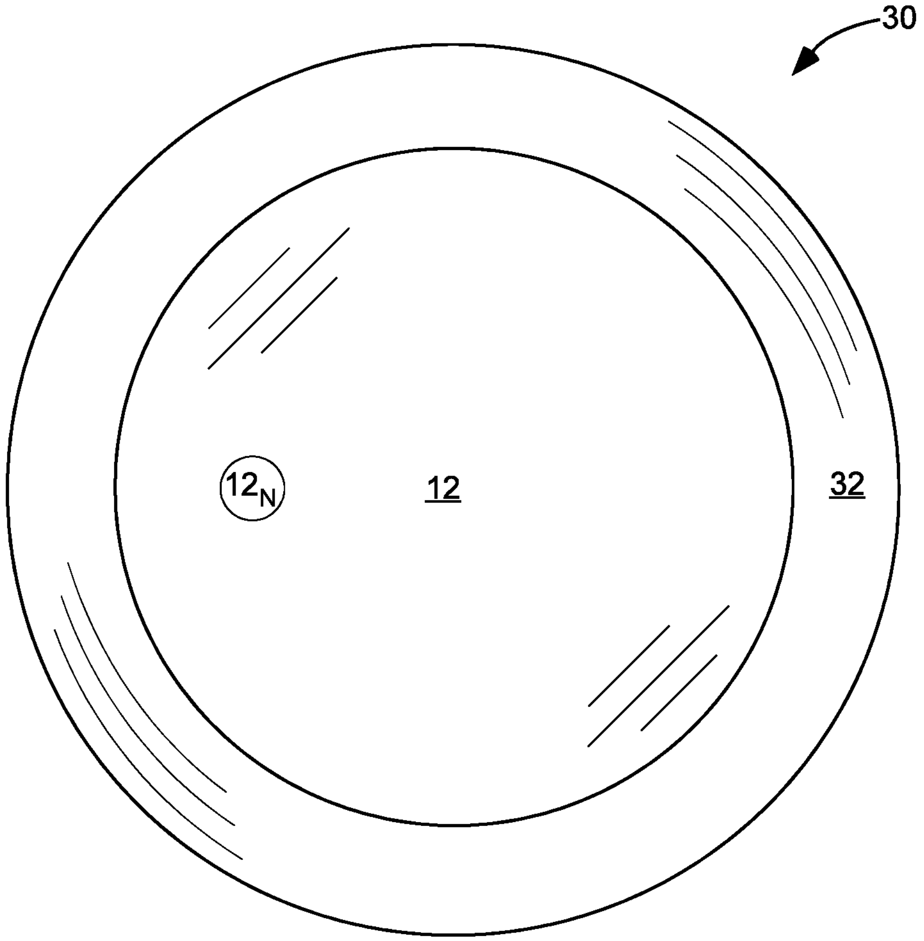

FIG. 4 is a schematic bottom-view (annular-film 32 side) of the x-ray window 30 of FIG. 3.

Figure 5:
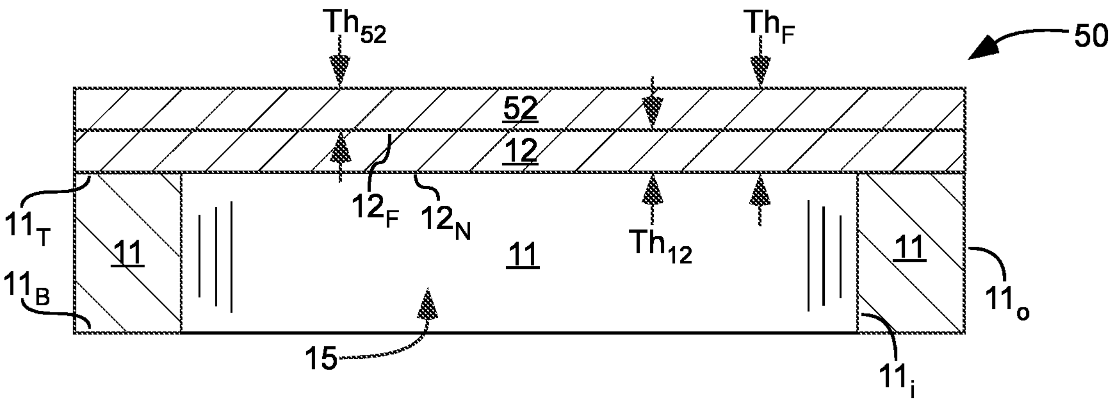

FIG. 5 is a cross-sectional side-view of an x-ray window 50, similar to x-ray windows 10 and 30, but further comprising a thin film 52 on a far-side 12$_F$ of the boron-film 12, farther from the support-frame 11.

Figure 6:
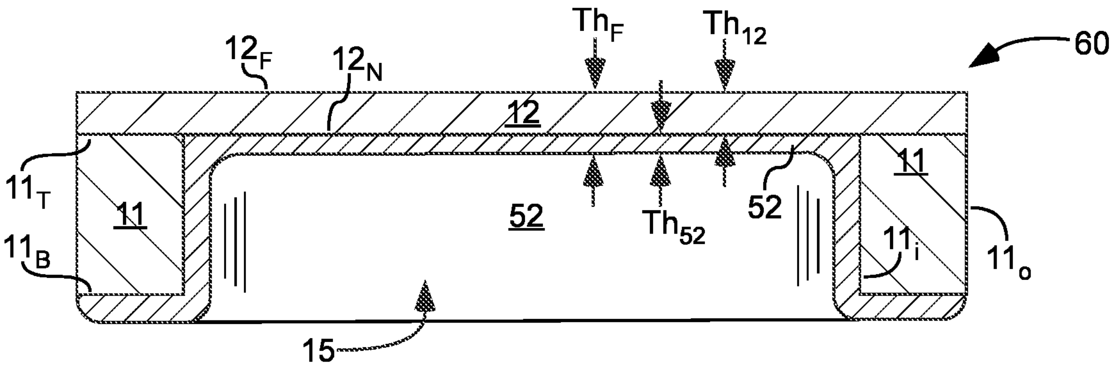

FIG. 6 is a cross-sectional side-view of an x-ray window 60, similar to x-ray window 10, but further comprising a thin film 52 on a near-side 12$_N$ of the boron-film 12, nearer to the support-frame 11.

Figure 7:
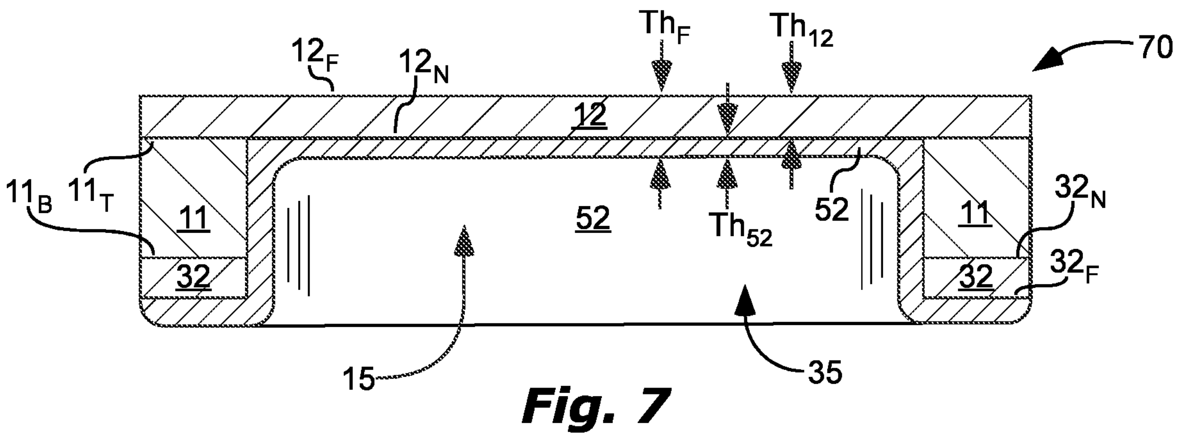

FIG. 7 is a cross-sectional side-view of an x-ray window 70, similar to x-ray window 30, but further comprising a thin film 52 on a near-side 12$_N$ of the boron-film 12, nearer to the support-frame 11.

Figure 8:
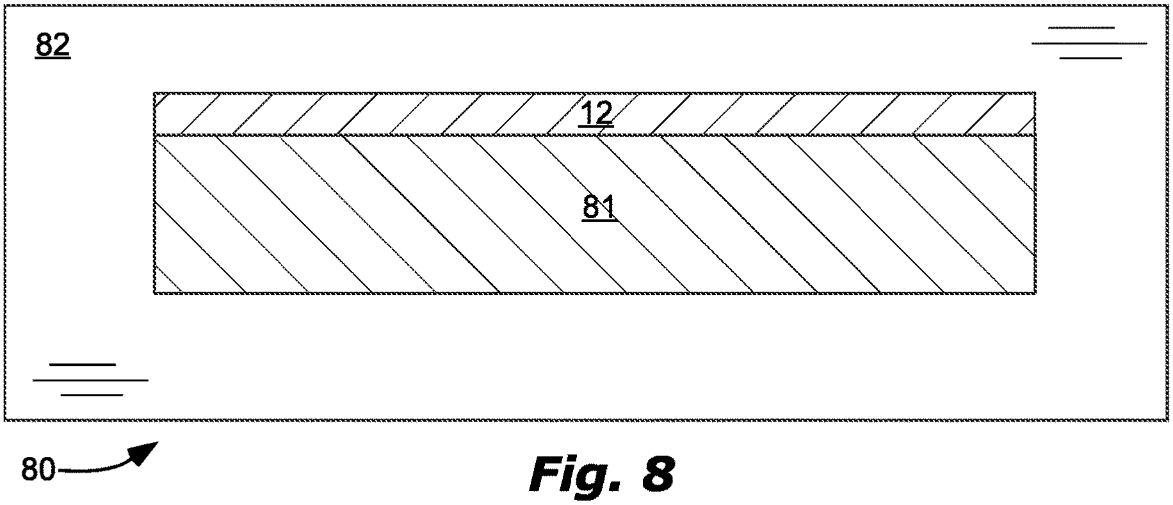

FIG. 8 is a cross-sectional side-view illustrating step 80 in a method of making an x-ray window, including placing a wafer 81 in an oven, and forming a boron-film 12 on the wafer.

Figure 9:
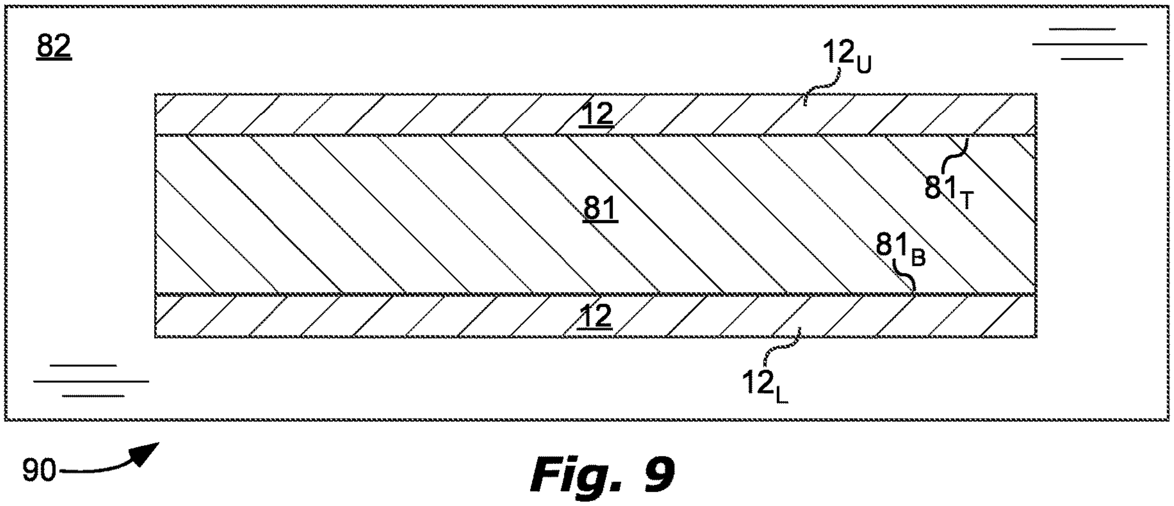

FIG. 9 is a cross-sectional side-view illustrating step 90 in a method of making an x-ray window, including: placing a wafer 81 in an oven, the wafer 81 having a top-side 81$_T$ and a bottom-side 81$_B$; and forming an upper-boron-film 12$_u$ on the top-side 81$_T$ of the wafer 81 and a lower-boron-film 121_, on the bottom-side 81$_B$ of the wafer 81.

DEFINITIONS

The following definitions, including plurals of the same, apply throughout this patent application.

As used herein, the term "identical material composition" means exactly identical or identical within normal manufacturing tolerances.

As used herein, the term "g/cm$^3$" means grams per cubic centimeters.

As used herein, the term "minimum thickness" means the smallest/minimum thickness of the specified material in the aperture 15 or 35.

As used herein, the terms "on", "located at", and "adjacent" mean located directly on or located over with some other solid material between. The terms "located directly on", "adjoin", "adjoins", and "adjoining" mean direct and immediate contact.

As used herein, the term "nm" means nanometer(s).

As used herein, the term "parallel" means exactly parallel, parallel within normal manufacturing tolerances, or nearly parallel such that any deviation from exactly parallel would have negligible effect for ordinary use of the device.

As used herein, the terms "top-side" and "bottom-side" refer to top and bottom-sides or faces in the figures, but the device may be oriented in other directions in actual practice. The terms "top" and "bottom" are used for convenience of referring to these sides or faces.

REFERENCE NUMBERS IN THE DRAWINGS

10, 30, 50, 60, and 70 are x-ray window embodiments.

The support-frame 11 can encircle an aperture 15. The support-frame 11 can include an inner-side 11$_i$ facing the aperture 15 and an outer-side 11$_o$ facing outward and opposite of the inner-side 11$_i$. The support-frame 11 can include a top-side 11$_T$ and a bottom-side 11$_B$ opposite of each other.

The boron-film 12 can include a near-side 12$_N$ (nearer the support-frame 11) and a far-side 12$_F$ (farther from the support-frame 11). Method step 90 shows an upper-boron-film 12$_u$ and a lower-boron-film 12$_L$.

The annular-film 32 can include an aperture 35, a near-side 32$_N$ (nearer the support-frame 11) and a far-side 32$_F$ (farther from the support-frame 11).

The thin-film 52 can be an aluminum-film or a film made of another material. The thin-film 52 can be a stack of multiple layers/multiple thin-films.

80 and 90 are steps in a method of making x-ray windows. Wafer 81 has a top-side 81$_T$ and a bottom-side 81$_B$. Wafer 81 is located in an oven 82.

DETAILED DESCRIPTION

Useful characteristics of x-ray windows include low gas permeability, low outgassing, high strength, low visible and infrared light transmission, high x-ray flux, made of low atomic number materials, corrosion resistance, high reliability, and low-cost. Each x-ray window design is a balance between these characteristics.

An x-ray window can combine with a housing to enclose an internal vacuum. The internal vacuum can aid device performance. For example, an internal vacuum for an x-ray detector (a) minimizes gas attenuation of incoming x-rays and (b) allows easier cooling of the x-ray detector.

Permeation of a gas through the x-ray window can degrade the internal vacuum. Thus, low gas permeability is a desirable x-ray window characteristic.

Outgassing from x-ray window materials can degrade the internal vacuum of the device. Thus, selection of materials with low outgassing is useful.

The x-ray window can face vacuum on one side and atmospheric pressure on an opposite side. Therefore, the x-ray window may need strength to withstand this differential pressure.

Visible and infrared light can cause undesirable noise in the x-ray detector. The ability to block transmission of visible and infrared light is another useful characteristic of x-ray windows.

A high x-ray flux through the x-ray window allows rapid functioning of the x-ray detector. Therefore, high x-ray transmissivity through the x-ray window is useful.

Detection and analysis of low-energy x-rays is needed in some applications. High transmission of low-energy x-rays is thus another useful characteristic of x-ray windows.

X-rays can be used to analyze a sample. X-ray noise from surrounding devices, including from the x-ray window, can interfere with a signal from the sample. X-ray noise from high atomic number materials are more problematic. It is helpful, therefore, for the x-ray window to be made of low atomic number materials.

X-ray windows are used in corrosive environments, and may be exposed to corrosive chemicals during manufacturing. Thus, corrosion resistance is another useful characteristic of an x-ray window.

X-ray window failure is intolerable in many applications. For example, x-ray windows are used in analysis equipment on Mars. High reliability is a useful x-ray window characteristic.

X-ray window customers demand low-cost x-ray windows with the above characteristics. Reducing x-ray window cost is another consideration.

The present invention is directed to various x-ray windows, and methods of making x-ray windows, that satisfy these needs. Each x-ray window or method may satisfy one, some, or all of these needs.

As illustrated in FIGS. 1-7, x-ray windows 10, 30, 50, 60, and 70 can include a boron-film 12 on a support-frame 11, and spanning an aperture 15 of the support-frame 11. These x-ray windows 10, 30, 50, 60, and 70 can include the following characteristics: low gas permeability, low outgassing, high strength, low visible and infrared light transmission, high x-ray flux, made of low atomic number materials, corrosion resistance, high reliability, and low-cost.

The boron-film 12 can be the main support structure spanning the aperture 15 of the support-frame 11, and can be thicker than any other material spanning the aperture 15. Example lower limits of a minimum thickness $Th_{12}$ of the boron-film 12 across the aperture include: $Th_{12} \geq 25$ nm, $Th_{12} \geq 50$ nm, $Th_{12} \geq 100$ nm, $Th_{12} \geq 300$ nm, or $Th_{12} \geq 500$ nm. Example upper limits of a minimum thickness $Th_{12}$ of the boron-film 12 across the aperture include: and $Th_{12} \leq 500$ nm, $Th_{12} \leq 750$ nm, $\leq 1200$ nm, $Th_{12} \leq 1500$ nm, $Th_{12} \leq 3000$ nm, or $Th_{12} \leq 10{,}000$ nm.

The support-frame 11 can have a ring shape, can encircle the aperture 15, or both. The support-frame 11 can have a top-side $\mathbf{11}_T$ and a bottom-side $\mathbf{11}_B$, which can be opposite of each other and parallel with respect to each other. The support-frame 11 can have an inner-side $\mathbf{11}_i$ facing the aperture 15 and an outer-side $\mathbf{11}_o$ opposite of the inner-side $\mathbf{11}_i$. The inner-side $\mathbf{11}_i$ and the outer-side $\mathbf{11}_o$ can extend between and can join the top-side $\mathbf{11}_T$ and the bottom-side $\mathbf{11}_B$. The support-frame 11 (and the wafer 81 described below) can comprise silicon, such as for example ≥30, ≥50, ≥90, or ≥95 mass percent silicon. The support-frame 11 (and the wafer 81 described below) can comprise silicon dioxide, such as for example ≥30, ≥50, ≥90, or ≥95 mass percent silicon dioxide.

The boron-film 12 can have a near-side $\mathbf{12}_N$ (nearer the support-frame 11) and a far-side $\mathbf{12}_F$ (farther from the support-frame 11), opposite of each other. The near-side $\mathbf{12}_N$ of the boron-film 12 can adjoin and/or be hermetically-sealed to the top-side $\mathbf{11}_T$ of the support-frame 11. The hermetic-seal can be a direct bond between the top-side $\mathbf{11}_T$ of the support-frame 11 and the boron-film 12. The hermetic-seal can be free of aluminum or an aluminum-film.

Example weight percentages of boron, throughout the entire boron-film 12, include ≥80, ≥90, ≥95, ≥97, ≥98, or ≥99 weight percent. Example weight percentages of hydrogen, throughout the entire boron-film 12, include ≥0.01, ≥0.05, ≥0.1, ≥0.5, ≥0.9, ≥2, or ≥4 weight percent hydrogen. Example density, throughout the entire boron-film 12, includes $\geq 1.94$ g/cm$^3$, $\geq 2.04$ g/cm$^3$, or $\geq 2.1$ g/cm$^3$ and $\leq 2.18$ g/cm$^3$, $\leq 2.24$ g/cm$^3$, or $\leq 2.34$ g/cm$^3$. For example, the boron-film 12 can have 99.1 weight percent boron, 0.9 weight percent hydrogen, and density of 2.14 g/cm$^3$. A window with these material properties can be manufactured as noted in the METHOD section below.

The aperture 15 of the support-frame 11 can consist of thin films spanning the entire aperture. The aperture 15 of the support-frame 11 can be free of material of the support-frame 11, free of ribs, or both.

As illustrated in FIGS. 3-4 and 7, x-ray windows 30 and 70 can further comprise an annular-film 32 on the bottom-side $\mathbf{11}_B$ of the support-frame 11. The annular-film 32 can be hermetically-sealed to the support-frame 11. The annular-film 32 can adjoin the bottom-side $\mathbf{11}_B$ of the support-frame 11. An aperture 35 of the annular-film 32 can be aligned with the aperture 15 of the support-frame 11. The annular-film 32 can be absent from, not extend into, and not cross the aperture 15 of the support-frame 11. The annular-film 32 can have material composition as described above for the boron-film 12. The boron-film 12 and the annular-film 32 can have an identical material composition. The boron-film 12 and the annular-film 32 can have similar thickness. For example $|Th_{12}-Th_{32}|/Th_{12}$, where $Th_{12}$ is a minimum thickness of the boron-film 12 and $Th_{32}$ is a minimum thickness of the annular-film 32.

Addition of the annular-film 32 can improve the ability of the x-ray window to withstand thermal stress during rapid or large temperature changes and can improve bonding of the x-ray window to a housing. The above benefits are particularly applicable if the annular-film 32 is similar in material and thickness to the boron-film 12.

X-ray windows 30 and 70, with the annular-film 32, can be combined with any other x-ray window examples described herein, including those shown in any of FIGS. 1 and 5-6.

As illustrated in FIGS. 5-7, a stack of films, including the boron-film 12 and a thin-film 52, can span the aperture 15 of the support-frame 11. The thin-film 52 can be an aluminum-film. Example material compositions of the aluminum-film include ≥25, ≥50, or ≥75 weight percent aluminum throughout the entire aluminum-film. Addition of the aluminum-film can improve the ability of the x-ray window to block visible light. The aperture 15 can consist only of the boron-film 12 and the aluminum-film.

The thin-film 52 can be located on the far-side $\mathbf{12}_F$ of the boron-film 12, as illustrated in FIG. 5. Because of superior corrosion resistance of the boron-film 12, a more likely location for the thin-film 52 is on the near-side $\mathbf{12}_N$, as illustrated in FIGS. 6-7. The thin-film 52 can adjoin a central portion of the near-side $\mathbf{12}_N$ of the boron-film 12.

The thin-film 52 on the far-side $\mathbf{12}_F$ of the boron-film 12 can be combined with the annular-film 32 (FIGS. 3 and 7).

The thin-film 52 on the far-side $12_F$ of the boron-film 12 can be combined with the thin-film 52 on the near-side $12_N$ (FIGS. 6-7).

An outer portion or outer ring of the near-side $12_N$ of the boron-film 12 can be attached to or adjoin the support-frame 11. A junction of the boron-film 12 and the support-frame 11 can be free of the thin-film 52.

The thin-film 52 can extend onto, cover, or adjoin the inner-side $11_i$ and the bottom-side $11_B$ of the support-frame 11, as illustrated in FIG. 6. The thin-film 52 can extend onto, cover, or adjoin the inner-side $11_i$ of the support-frame 11 and the far-side $32_F$ of the annular-film 32, as illustrated in FIG. 7.

Because aluminum has a higher atomic number than boron, it can be useful to have a relatively thin layer of aluminum. Thus for example, $Th_{52} \leq 0.5*Th_{12}$, $Th_{52} \leq 0.3*Th_{12}$, $Th_{52} \leq 0.1*Th_{12}$, where $Th_{52}$ is a minimum thickness of the thin-film 52 in the aperture 15 and $Th_{12}$ is a minimum thickness of the boron-film 12 in the aperture 15. Other example relationships, for the thin-film 52 to have sufficient thickness, include $Th_{52} \geq 0.001*Th_{12}$, $Th_{52} \geq 0.01*Th_{12}$, or $Th_{52} \geq 0.1*Th_{12}$.

The boron film 12 can be the primary film or only film spanning the aperture 15. Thus, for example, $Th_F \leq 1.1*Th_{12}$, $Th_F \leq 1.25*Th_{12}$, $Th_F \leq 1.5*Th_{12}$, or $Th_F \leq 2*Th_{12}$.

The aluminum-film and the boron-film 12 can be the only solid structures spanning the aperture 15 of the support-frame 11. The boron film 12 and the aluminum-film can be the primary films, or only films, spanning the aperture 15. Thus, for example, $Th_F \leq 1.1*(Th_{12}+Th_{52})$, $Th_F \leq 1.25*(Th_{12}+Th_{52})$, $Th_F \leq 1.5*(Th_{12}+Th_{52})$, or $Th_F \leq 2*(Th_{12}+Th_{52})$. $Th_F$ is a minimum thickness of the films in the aperture 15.

The x-ray window can be hermetically sealed to a housing, with an internal vacuum. The boron-film 12 can face atmospheric pressure and the aluminum-film can face a vacuum.

Method

A method of manufacturing an x-ray window can comprise some or all of the following steps, which can be performed in the following order. There may be additional steps not described below. These additional steps may be before, between, or after those described.

The method can comprise placing a wafer 81 in an oven 82; introducing a gas into the oven 82, the gas including boron, and forming boron-film(s) 12 on the wafer 81 (step 80 in FIG. 8 or step 90 in FIG. 9). The gas can include diborane, such as for example ≥5 molar percent diborane and ≥70 molar percent argon.

Deposition temperature can be adjusted to control percent hydrogen and percent boron. Lower (higher) temperature can result in in increased (decreased) hydrogen in the boron-film 12. For example, a temperature of 390° C. can result in about 1% H in the boron-film 12. Other example temperatures in the oven 82, during formation of the boron-film(s) 12, include ≥50° C., ≥100° C., ≥200° C., ≥300° C. or ≥340° C. and ≤340° C., ≤380° C., ≤450° C., ≤525° C., ≤550° C., or ≤600° C.

Formation of the boron-film 12 can be plasma enhanced, in which case the temperature of the oven 82 can be relatively lower. A pressure in the oven can be relatively low, such as for example 60 pascal. Higher pressure deposition might require a higher process temperature.

As illustrated in FIG. 9, the wafer 81 can have a top-side $81_T$ and a bottom-side $81_B$. The top-side $81_T$ and the bottom-side $81_B$ can be opposite of each other and can be parallel with respect to each other. Both the top-side $81_T$ and the bottom-side $81_B$ can be exposed to the gas (mount or hold the wafer at its outer edges). Forming the boron-film(s) 12 can include forming an upper-boron-film $12_U$ on the top-side $81_T$ of the wafer 81 and forming a lower-boron-film $12_L$ on the bottom-side $81_B$ of the wafer 81.

Here is an example of deposition to form boron-film(s) 12 with about 99.1 weight percent boron, 0.9 weight percent hydrogen, and density of 2.14 g/cm$^3$: A wafer 81 is loaded into the oven 82. The furnace is evacuated (about 450 mTorr) and temperature stabilized at ~390° C. A gas with 15 molar percent diborane and 85 molar percent argon is introduced into the oven, resulting in deposition of the boron-film(s) 12. Oven 82 pressure is controlled by an adjustable butterfly valve at the vacuum inlet.

After step 80, the method can further comprise etching through a center of the wafer 81 at the bottom-side $81_B$ to form a support-frame 11 encircling an aperture 15 (see FIGS. 1-2).

After step 90, the method can further comprise etching through a center of the lower-boron-film $12_S$ to form an annular-film 32 and etching through a center of the wafer 81 at the bottom-side $81_B$ to form a support-frame 11 encircling an aperture 15 (see FIGS. 3-4). The annular-film 32 can be used as a mask to etch the wafer 81 to form the support-frame 11. Etch of the wafer can continue up to the boron-film 12 or upper-boron-film $12_U$.

A resist can be used to form the desired annular-shape of the annular-film 32 or the support-frame 11. A solution of potassium ferricyanide, a fluorine plasma (e.g. NF3, SF6, CF4), or both, can be used to etch the lower-boron-film $12_S$. Example chemicals for etching the wafer 81 include ammonium hydroxide, cesium hydroxide, potassium ferricyanide, potassium hydroxide, sodium hydroxide, sodium oxalate, tetramethylammonium hydroxide, or combinations thereof. The resist can then be stripped, such as for example with sulfuric acid and hydrogen peroxide (e.g. Nanostrip).

Some (e.g. ≥25%, ≥50%, ≥75%, or ≥90%) of the near-side $12_N$ and the far-side $12_F$ of the boron-film 12 can both face atmospheric pressure, a gas, or both at this step in the process (after etch and before the deposition of thin-film 52/aluminum-film).

A thin-film 52 (e.g. an aluminum-film) can be deposited on the far-side $12_F$ of the boron-film 12 (FIG. 5).

A thin-film 52 (e.g. an aluminum-film) can be deposited on the near-side $12_N$ of the boron-film 12 (or the near-side $12_N$ of the upper-boron-film $12_U$), on the inner-side $11_i$ of the support-frame 11, on the bottom-side $11_B$ of the support-frame 11, or combinations thereof (FIG. 6). If the x-ray window includes the annular-film 32, then deposition can occur on an inside surface and the far-side $32_F$ of the annular-film 32 instead of on the bottom-side $11_B$ of the support-frame 11 (FIG. 7). The method can further comprise applying an adhesion layer (e.g. Cr, Si, Zn) on the boron-film 12 before applying, or during application of, the aluminum-film.

The x-ray window can then be sealed to a housing with a vacuum inside of the housing. The boron-film 12 (or upper-boron-film 12*u*) can face atmospheric pressure outside of the housing, and the aluminum-film can face the vacuum.

The support-frame 11, boron-film(s) 12, annular-film 32, and the thin-film(s) 52 can have properties as described above.

What is claimed is:

1. A method of manufacturing an x-ray window, the method comprising:

placing a wafer in an oven, the wafer having a top-side and a bottom-side, the top-side and the bottom-side opposite of each other and parallel with respect to each other;

introducing a gas into the oven, the gas including boron, forming an upper-boron-film on the top-side of the wafer with a near-side of the upper-boron-film facing the top-side of the wafer and a top-surface opposite of the near-side, and forming a lower-boron-film on the bottom-side of the wafer;

etching through a center of the lower-boron-film to form an annular-film encircling an aperture, the annular-film having a near-side facing the wafer and a far-side opposite of the near-side; and etching through a center of the wafer at the bottom-side to form a support-frame encircling an aperture.

2. The method of claim 1, wherein the upper-boron-film and the annular-film have ≥97 weight percent boron, ≥0.3 weight percent hydrogen, and a density of ≥2.04 $g/cm^3$ and ≤2.24 $g/cm^3$.

3. The method of claim 1, further comprising depositing an aluminum-film on an inside surface of the support-frame and on an inside surface and the far-side of the annular-film, both inside surfaces facing the apertures.

4. The method of claim 3, further comprising depositing the aluminum-film on the upper-boron-film.

5. The method of claim 4, further comprising sealing the x-ray window to a housing and forming a vacuum inside of the housing, the boron-film faces atmospheric pressure outside of the housing, and the aluminum-film faces the vacuum.

6. The method of claim 4, wherein the aluminum-film has ≥50 weight percent aluminum throughout the entire aluminum-film.

7. The method of claim 4, wherein $Th_F \leq 1.25*(Th_{12}+Th_{52})$, where $Th_F$ is a minimum thickness of all solid structures spanning the aperture, $Th_{12}$ is a minimum thickness of the upper-boron-film in the aperture, and $Th_{52}$ is a minimum thickness of the aluminum-film in the aperture.

8. The method of claim 1, wherein etching through the center of the wafer at the bottom-side to form the support-frame includes using the annular-film as a mask and etching to the upper-boron-film.

9. The method of claim 1, wherein a material composition of the wafer is ≥90 mass percent silicon.

10. The method of claim 1, wherein the gas includes diborane.

11. The method of claim 1, wherein the gas includes ≥5 molar percent diborane and ≥70 molar percent argon.

12. The method of claim 1, wherein:

forming the upper-boron-film and the lower-boron-film is plasma enhanced and the oven has a temperature of between 100° C. and 340° C. during formation of the upper-boron-film and the lower-boron-film; and etching through the center of the lower-boron-film and etching through the center of the wafer includes using potassium hydroxide, tetramethylammonium hydroxide, cesium hydroxide, ammonium hydroxide, potassium ferricyanide, sodium hydroxide, sodium oxalate, or combinations thereof.

13. A method of manufacturing an x-ray window, the method comprising the following steps in the following order:

placing a wafer in an oven, the wafer having a top-side and a bottom-side, the top-side and the bottom-side opposite of each other and parallel with respect to each other;

introducing a gas into the oven, the gas including diborane, forming an upper-boron-film on the top-side of the wafer, the upper-boron-film having a near-side and a far-side opposite of each other, the near-side of the upper-boron-film facing the top-side of the wafer, the upper-boron-film having ≥97 weight percent boron and ≥0.3 weight percent hydrogen;

etching through a center of the wafer at the bottom-side to form a support-frame encircling an aperture, the near-side and the far-side of the upper-boron-film facing atmospheric pressure, a gas, or both; and depositing an aluminum-film directly on the near-side of the upper-boron-film.

14. The method of claim 13, wherein after etching and prior to depositing the aluminum-film, at least 50% of the near-side and the top-surface of the upper-boron-film face atmospheric pressure, a gas, or both.

15. The method of claim 13, further comprising depositing the aluminum-film on an inside surface of the support-frame, the inside surface facing the aperture.

16. The method of claim 13, wherein a material composition of the wafer is ≥90 mass percent silicon.

17. The method of claim 13, wherein the gas includes ≥5 molar percent diborane and ≥70 molar percent argon.

18. The method of claim 13, wherein forming the upper-boron-film and the lower-boron-film is plasma enhanced and the oven has a temperature of between 100° C. and 340° C. during formation of the upper-boron-film and the lower-boron-film.

19. The method of claim 13, wherein the oven has a temperature of between 340° C. and 550° C. during formation of the upper-boron-film and the lower-boron-film.

20. The method of claim 13, wherein etching through the center of the lower-boron-film and etching through the center of the wafer includes using potassium hydroxide, tetramethylammonium hydroxide, cesium hydroxide, ammonium hydroxide, potassium ferricyanide, sodium hydroxide, sodium oxalate, or combinations thereof.

* * * * *